United States Patent
Kim

(10) Patent No.: US 7,283,847 B2
(45) Date of Patent: Oct. 16, 2007

(54) PORTABLE DIGITAL COMMUNICATION DEVICE

(75) Inventor: Young-Se Kim, Los Altos, CA (US)

(73) Assignee: Samsung Electronics Co., Ltd. (KR)

( * ) Notice: Subject to any disclaimer, the term of this patent is extended or adjusted under 35 U.S.C. 154(b) by 385 days.

(21) Appl. No.: 10/646,918

(22) Filed: Aug. 22, 2003

(65) Prior Publication Data

US 2005/0020323 A1 Jan. 27, 2005

Related U.S. Application Data

(60) Provisional application No. 60/405,565, filed on Aug. 22, 2002.

(30) Foreign Application Priority Data

Aug. 21, 2003 (KR) ............... 10-2003-0057751

(51) Int. Cl.
 *H04B 1/38* (2006.01)
(52) U.S. Cl. ............ 455/566; 455/90.3; 455/575.1; 455/550.1
(58) Field of Classification Search ............ 455/566, 455/90.3, 575.1, 550.1, 575.4, 575.8; 348/207.1
See application file for complete search history.

(56) References Cited

U.S. PATENT DOCUMENTS

| | | | |
|---|---|---|---|
| 6,397,078 B1 * | 5/2002 | Kim | 455/556.2 |
| 6,748,249 B1 * | 6/2004 | Eromaki et al. | 455/575.4 |
| 6,850,226 B2 * | 2/2005 | Finke-Anlauff | 345/169 |
| 2001/0027121 A1 * | 10/2001 | Boesen | 455/556 |
| 2002/0065102 A1 * | 5/2002 | Miyake et al. | 455/556 |
| 2002/0137476 A1 * | 9/2002 | Shin | 455/90 |
| 2003/0003878 A1 * | 1/2003 | Bestle | 455/90 |
| 2003/0103041 A1 * | 6/2003 | Nguyen et al. | 345/168 |
| 2003/0143961 A1 * | 7/2003 | Humphreys et al. | 455/90 |

* cited by examiner

*Primary Examiner*—Joseph Feild
*Assistant Examiner*—Huy D Nguyen
(74) *Attorney, Agent, or Firm*—The Farrell Law Firm, P.C.

(57) ABSTRACT

A portable digital communication device, in which it is convenient to manipulate keys using fingers of both hands while chatting or playing a game. The device comprises a main housing provided with a display unit on a top surface thereof, a first key pad being capable of sliding on the top surface of the main housing in one direction relative to the display unit so as to open and close one side of the display unit, and a second key pad being capable of sliding on the top surface of the main housing in the other direction relative to the display unit so as to open and close the other side of the display unit and being capable of sliding toward or away from the first key pad.

5 Claims, 4 Drawing Sheets

PORTABLE DIGITAL COMMUNICATION DEVICE

PRIORITY

This application claims priority to an application entitled "*Wireless Telephone/Digital Camera With Qwerty Keyboard*" filed in the U.S. Patent & Trademark Office on Aug. 22, 2002, and assigned U.S. Provisional Patent Application Ser. No. 60/405,565, and an application entitled "*Portable Digital Communication Device*" filed in the Korean Intellectual Property Office on Aug. 21, 2003, and assigned Korean Patent Application Serial No. 2003-57751, the contents of which are hereby incorporated by reference.

BACKGROUND OF THE INVENTION

1. Field of the Invention

The present invention relates to a portable digital communication device, such as a cellular phone, a PDA (Personal Digital Assistants), an HHP (Hand Held Phone), etc., and in particular, to providing convenience of key manipulation while chatting, playing a game, or inputting complicate data for transmission of an e-mail using fingers of both hands.

2. Description of the Related Art

In general, a "portable communication device" is an electronic device that a user can carry to perform wireless communication with a desired partner. In consideration of portability, design of such a portable communication device has tended not only toward compactness, slimness, and lightness, but also toward increasing use of multimedia capable of pursuing increasingly various functions. In particular, future portable communication devices will be used for many functions and purposes despite compactness and lightness, and they will be modified to be suitable for environments of various multimedia or internets. Additionally, such portable communication devices will be used by men and women, young and old, anywhere all over the world, and will be considered a commodity, which needs to be carried all the time.

Universalized conventional portable communication devices are classified into various types according to their appearances. The portable communication devices are classified into a bar-type, a flip-type, or a folder-type, for example, in accordance with their geometrical appearances. The bar-type communication device has a single housing which is formed in a bar shape. The flip-type communication device has a flip, which is pivotably mounted to a bar-shaped housing by a hinge unit. The folder-type communication device has a folder, which is pivotably coupled to a single bar-shaped housing by a hinge unit to make the folder to be foldable.

Further, the portable communication device may be classified into a neck wearable type or a wrist wearable type based on a position or way in which a user puts it on. The neck wearable type communication device is one, which a user wears around the neck using a string, while the wrist wearable type communication device is one, which a user wears around the wrist.

Additionally, such portable communication devices may be classified into a rotation-type or a sliding-type based on the method of opening and closing the device. In the case of the rotation-type communication device, two housings are coupled to each other in a manner that one housing rotates to opened or closed relative to the other while facing each other. In the case of the sliding-type communication device, two housings are coupled to each other in a manner that one housing slides to be opened or closed relative to the other. These variously classified communication devices are easily understood by those skilled in the art.

Such conventional portable communication devices have been designed to allow for a voice communication function as well as a high-speed data communication function. That is, as consumer demands have increased, various services have been provided using wireless communication technology for transceiving data at a high speed.

It is a present tendency that a photographing function is employed in the portable communication device, so that it is even possible to transmit an image signal. Such a universalized portable communication device is provided with a camera lens module of a built-in or built-out type, so that is possible to perform image communication with a desired partner or to photograph a desired subject.

However, this conventional portable communication device has disadvantages in that it is inconvenient to manipulate keys while inputting a large amount of data for transmitting an e-mail, or while chatting or playing a game.

SUMMARY OF THE INVENTION

Accordingly, the present invention has been designed to solve the above-mentioned problems occurring in the prior art, and an object of the present invention is to provide a portable communication device comprising key pads, by which it is convenient to manipulate keys with fingers of both hands.

It is another object of the present invention to provide a portable communication device comprising key pads, by which it is convenient to manipulate keys while inputting complex data, or while chatting or playing a game with a desired partner.

In order to accomplish these objects, there is provided a portable communication device comprising: a main housing provided with a display unit on a top surface thereof; a first key pad being capable of sliding on the top surface of the main housing in one direction relative to the display unit so as to open and close one side of the display unit; and a second key pad being capable of sliding on the top surface of the main housing in the other direction relative to the display unit so as to open and close the other side of the display unit and being capable of sliding toward or away from the first key pad.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
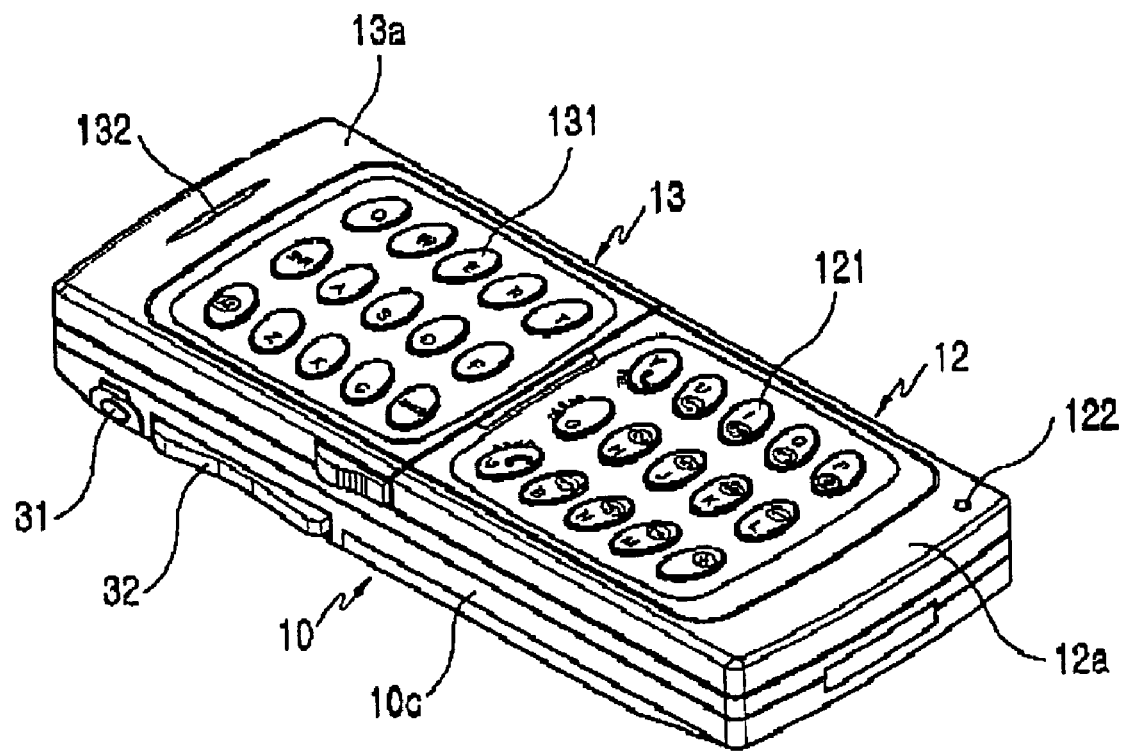
FIG. 1 is a perspective view showing a portable digital communication device according to a preferred embodiment of the present invention when not in use.

Hereinafter, preferred embodiments of the present invention will be described in detail with reference to the accompanying drawings. In the following description of the present invention, a detailed description of known functions and configurations incorporated herein will be omitted when it may make the subject matter of the present invention rather unclear.

As shown in FIGS. 1 to 4, a portable digital communication device according to a preferred embodiment of the present invention comprises a main housing 10, and first and second key pads 12 and 13, which open and close on the main housing 10, while continuously facing to a top surface 10a of the main housing 10. Thus, it should be noted that the portable digital communication device is to provide facilitation of key manipulation relative to the first and second key pads 12 and 13 using fingers of both hands. Here, the term "facilitation of key manipulation" includes speed and accuracy of key manipulation when a user manipulates keys, in other words, when a user presses down keys. Further, the portable digital communication device according to the present invention is designed so that the first and second key pads 12 and 13 are mounted to slide toward or away from each other so as to promote convenience of the key manipulation using both hands.

More specifically, the portable digital communication device according to the present invention comprises a main housing 10 provided with a display unit 16 on a top surface 10a thereof, a first key pad 12 mounted to slide in one direction relative to the display unit 16 in a state of facing the top surface 10a of the main housing 10, for opening and closing one side of the display unit 16, and a second key pad 13 mounted to slide toward or away from the first key pad 12 in the other direction relative to the display unit 16 in a state of facing the top surface 10a of the main housing 10, for opening and closing the other side of the display unit 16.

The first and second key pads 12 and 13, which slide on the top surface 10a of the main housing 10, may be operated manually, part-automatically, or full-automatically.

The top surface 10a of the main housing 10 is divided into an open-close portion where the middle of top surface 10a is selectively exposed depending on the sliding movement of the first and second key pads 12 and 13, and close portions (specifically not shown) where the opposite sides of top surface 10a are always covered regardless of the sliding movement of the first and second key pads 12 and 13. The display unit 16 is located at the open-close portion of the top surface 10a.

The main housing 10 has one or more functional keys 21 and 22 located on one side surface 10b, a headphone jack 31, and a volume adjusting button 32 mounted on the other side surface 10c, and a battery pack 23 disposed on a bottom surface 10d. The battery pack 23 is locked or unlocked by a latch 24.

Further, the main housing 10 further comprises a cylindrical lens housing 30 mounted with a camera lens 18 to be exposed at a transition portion between the side surface 10b and the bottom surface 10c, and a shutter key 19 neighboring the lens housing 30. The cylindrical lens housing 30 has a rotation axis which is parallel to and spaced a predetermined distance from a virtual plane on which the first and second key pads 12 and 13 linearly move. Further, the camera lens 18 is rotatably mounted between the side surface 10b and the bottom surface 10c.

However, the portable digital communication device according to the present invention is not necessary to be limited to the construction in which the employed lens housing 30 is rotatably mounted. Thus, the lens housing 30 may be non-rotatably mounted at a predetermined position of the main housing 10.

The first key pad 12 has a top surface 12a (FIG. 2) mounted with at least one key 121, a top of which is adapted to be exposed, and with a microphone 122 located near the key 121. Similarly, the second key pad 13 has a top surface 13a mounted with at least one key 131, a top of which is adapted to be exposed, and with a speaker 132 located near the key 131.

To be more specific, the top surface 12a of the first key pad 12 is provided with at least 15 to 20 keys, and the top surface 13a of the second key pad 13 is also provided with at least 15 to 20 keys. For example, the keys 121 of the first key pad 12 may include numeral and character keys (e.g., having an arrangement of a QWERTY keyboard), a SEND key, a CLEAR key, an END key, etc. The keys 131 of the second key pad 13 include character keys (e.g., having arrangement of a QWERTY keyboard), a SHIFT key, a SPACE key, an ALT key, etc.

Preferably, the first and second key pads 12 and 13 slide toward and away from each other on the top surface 10a of the main housing 10, so that they open and close from/on the display unit 16. Specifically, when the first and second key pads 12 and 13 move away from each other to the maximum extent, the display unit 16 is fully opened. By contrast, when the first and second key pads 12 and 13 move toward each other to the maximum extent, the display unit 16 is fully closed.

Figure 2:
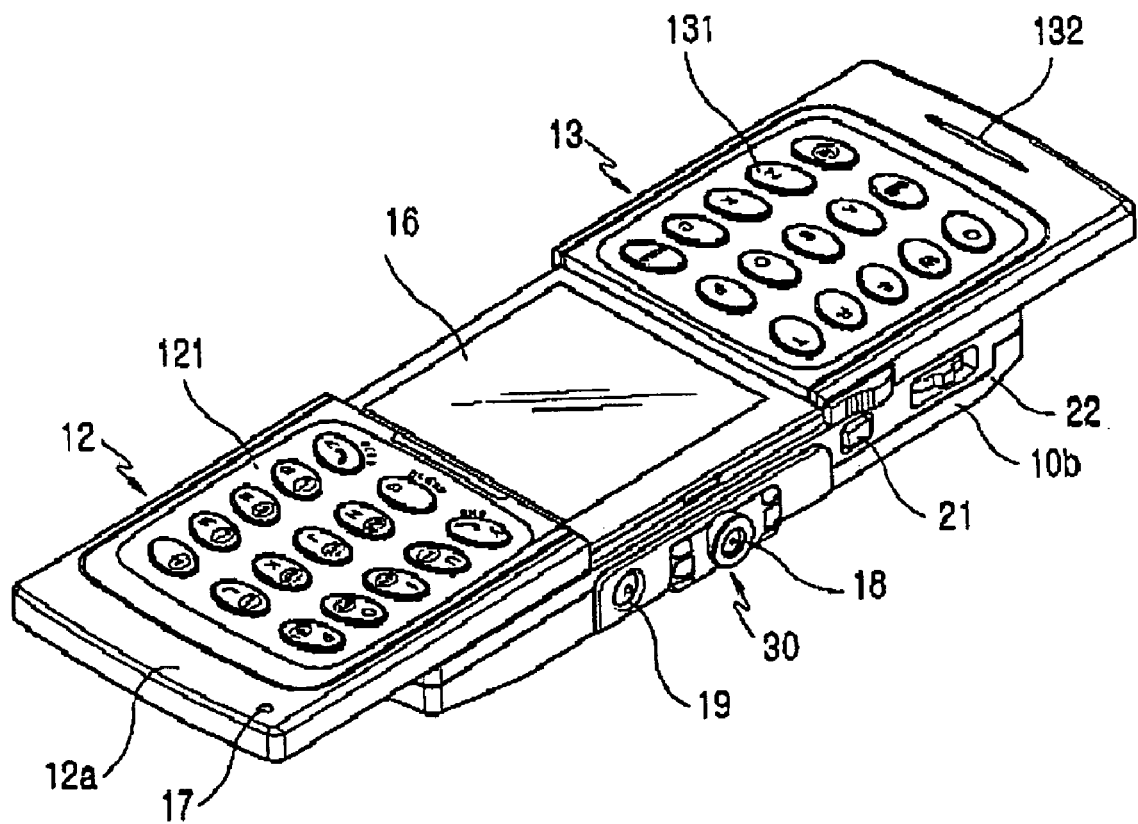
FIG. 2 is a perspective view showing a state in which first and second key pads are fully opened when the portable digital communication device of FIG. 1 is used in a calling mode.
Figure 3:
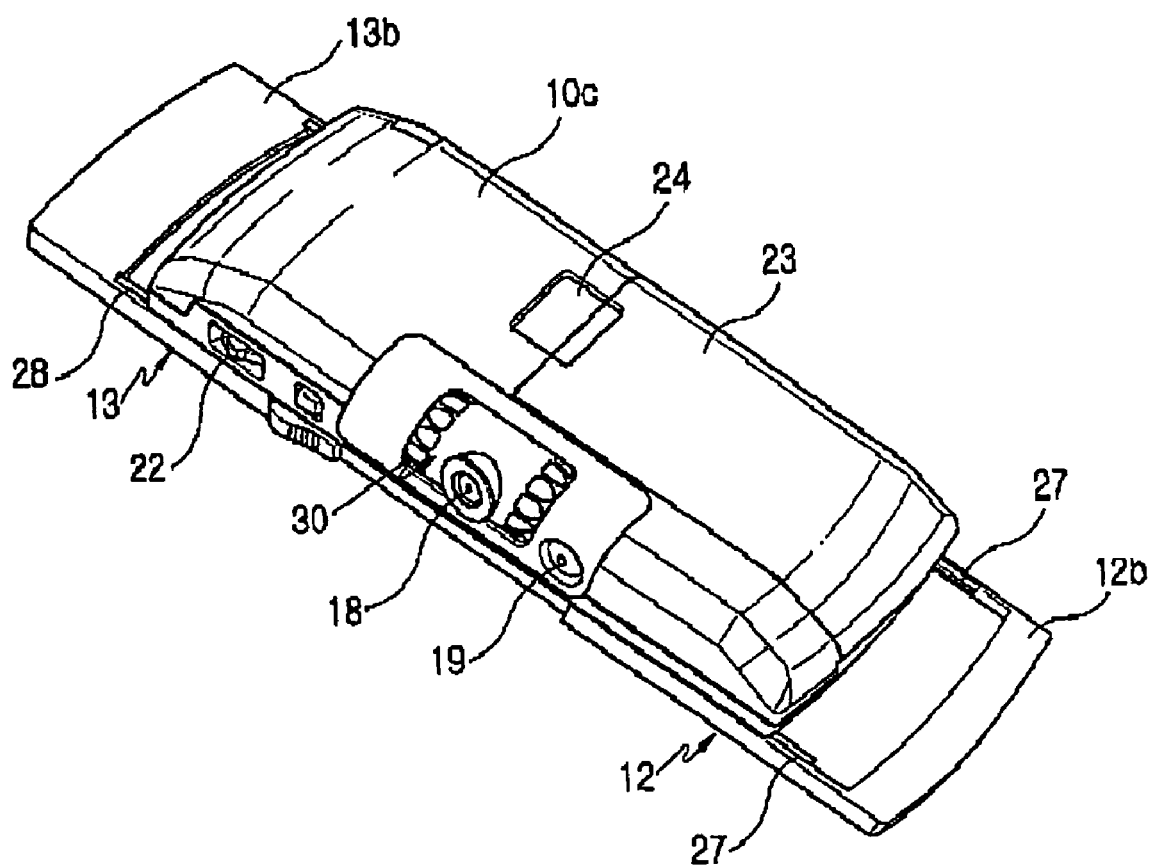
FIG. 3 is a rear perspective view of the portable digital communication device shown in FIG. 2.
Figure 4:
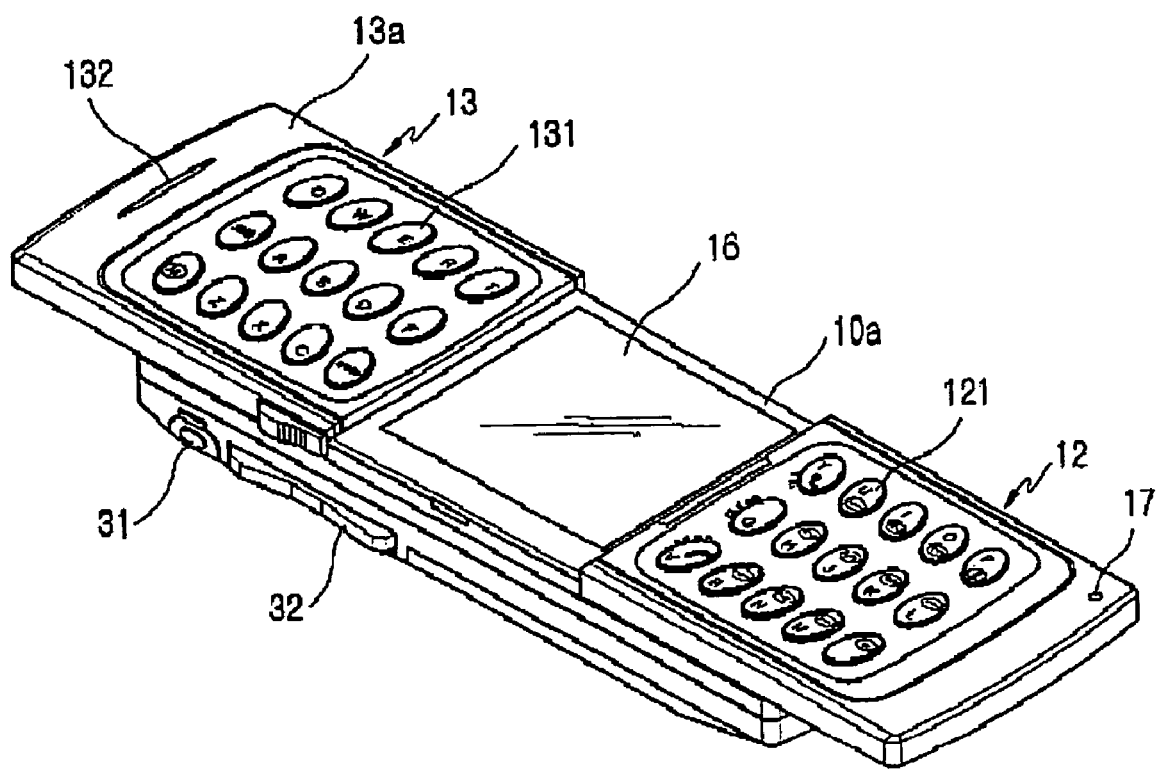
FIG. 4 is another perspective view of the portable digital communication device shown in FIG. 2 when it is used in a chatting or e-mail transmission mode.

FIG. 1 shows a state in which the display unit 16 is fully closed as the first and second key pads 12 and 13 are moved toward each other to the maximum extent. FIGS. 2 to 4 each shows a state in which the display unit 16 is fully opened as the first and second key pads 12 and 13 are moved away from each other to the maximum extent. That is, the first and second key pads 12 and 13 are each preferably constructed to open about half of the display unit 16. Further, the display unit 16 is preferably located in the middle of the main housing 10.

The display unit 16 may be implemented as an LCD module, a touch screen, or a hologram screen.

In FIG. 3, sliding guide rails 27 and 28 are shown, each of which is provided on bottom surfaces 12b and 13b of the first and second key pads 12 and 13, respectively. The bottom surfaces 12b and 13b of the first and second key pads are flat.

With the foregoing construction, for example, in the state of FIG. 2, the first key pad 12 is used for a dialing or calling operation mode.

In the state of FIG. 4, the first and second key pads 12 and 13 are all used for a multimedia operation mode, for example, when a user intends to input complex data for transmission of an e-mail, to do chatting, play a game with a desired partner, etc., using fingers of both hands.

As mentioned above, in the present invention, the first and second key pads 12 and 13 are designed to slide toward and away from each other on the top surface 10a of the main housing 10, so that it is convenient for a user to manipulate keys with his/her own fingers, and thus, chat or play a game. Additionally, the present invention has an advantage in that the first and second key pads 12 and 13 can protect the display unit 16.

While the present invention has been shown and described with reference to certain preferred embodiments thereof, it will be understood by one skilled in the art that various modifications may be made therein without departing from the spirit and scope of the invention as defined by the appended claims.

What is claimed is:

1. A portable digital communication device comprising:
   a main housing provided with a display unit on a top surface thereof;
   a first key pad being capable of sliding on the top surface of the main housing in a first direction relative to the display unit so as to open and close a first side of the display unit; and
   a second key pad being capable of sliding on the top surface of the main housing in a second direction relative to the display unit so as to open and close a second side of the display unit and being capable of sliding toward and away from the first key pad,
   wherein the main housing comprises:
   a cylindrical lens housing and a shutter key, the cylindrical lens housing having a camera lens exposed between a side surface of the main housing and a bottom surface of the main housing, the cylindrical lens housing rotating about an axis which is parallel to and spaced a predetermined distance from a virtual plane on which the first and second key pads linearly move, the camera lens being rotatably mounted between the side surface and the bottom surface.

2. The portable digital communication device according to claim 1, wherein the display unit is located in an intermediate portion of the top surface of the main housing.

3. The portable digital communication device according to claim 1, wherein the main housing comprises:
   at least one functional key located on a side surface thereof;
   a headphone jack and a volume adjusting button mounted on a side surface thereof; and
   a battery pack disposed on a bottom surface thereof.

4. The portable digital communication device according to claim 1, wherein the first key pad further comprises a microphone on the top surface thereof, and the second key pad is provided with a speaker on the top surface thereof.

5. The portable digital communication device according to claim 1, wherein the first and second key pads slide toward and away from each other on the top surface of the main housing to open and close the display unit, so that the display unit is fully opened when the first and second key pads move away from each other to a maximum extent, and the display unit is fully closed when the first and second key pads move toward each other to a maximum extent.

* * * * *